(No Model.)
J. L. HATCH.
HOLE CLOSING DEVICE FOR BICYCLE TIRES.
No. 562,764. Patented June 23, 1896.
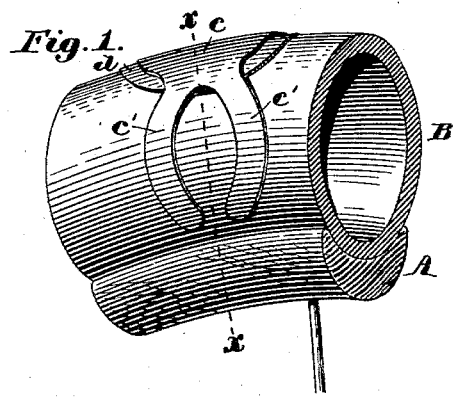
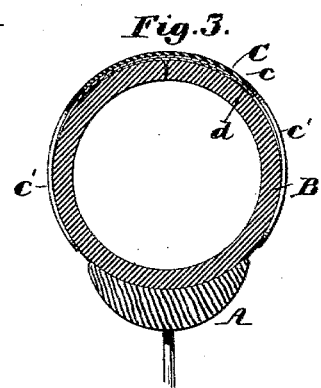
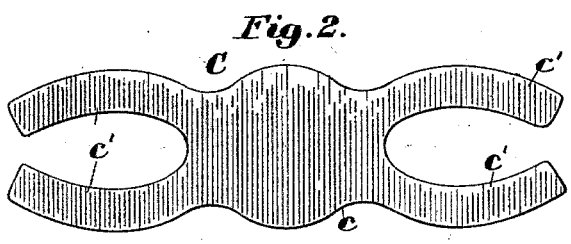
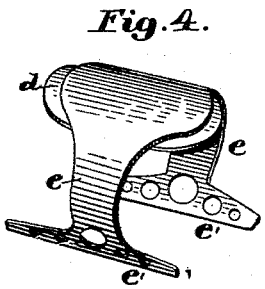
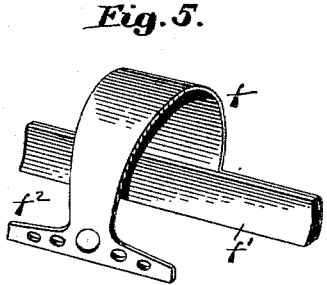
Witnesses:
Walter E. Lombard
Thomas J. Drummond
Inventor:
James L. Hatch,
by Crosby Gregory
Att'ys.

UNITED STATES PATENT OFFICE.

JAMES L. HATCH, OF MILFORD, MASSACHUSETTS, ASSIGNOR, BY MESNE ASSIGNMENTS, TO THE HATCH BICYCLE PATCH COMPANY, OF SACO, MAINE.

HOLE-CLOSING DEVICE FOR BICYCLE-TIRES.

SPECIFICATION forming part of Letters Patent No. 562,764, dated June 23, 1896.

Application filed February 19, 1896. Serial No. 579,811. (No model.)

*To all whom it may concern:*

Be it known that I, JAMES L. HATCH, of Milford, county of Worcester, State of Massachusetts, have invented an Improvement in Hole-Closing Devices for Bicycle-Tires, of which the following description, in connection with the accompanying drawings, is a specification, like letters on the drawings representing like parts.

This invention has for its object to provide a device adapted to be readily applied to bicycle or rubber-tube tires to temporarily close accidental holes or punctures in the same.

My hole-closing device consists of a metallic spring clip or clamp adapted to partially embrace and cling to an inflated tire.

Figure 1 shows part of a bicycle rim and tire with my device in place. Fig. 2 shows the blank from which it is made; Fig. 3, a section in the line $x\ x$, Fig. 1; Figs. 4 and 5, modified forms of my device.

The rim A and tire B are and may be of any usual shape.

If the tire should accidentally be punctured, the operator may, by applying my device to the tire, it in no way touching the rim, continue his journey.

My device is composed of light thin resilient metal.

Fig. 2 shows a steel blank C, from which to make my hole-closing device, (shown in Figs. 1 and 3,) it having a central part $c$, with spring arms or horns $c'$, the said blank being bent to embrace the tire when deflated and to cling to the tire when inflated, for during the inflation the tire swells inside the arms, which results in crowding the part $c$ of the hole-closer closer to the surface of the tire.

The hole-closer is provided at its inner side with a pad $d$, preferably of india-rubber, and before applying the pad and hole-closer to the punctured part of the tire the rider will preferably apply a little india-rubber cement to the hole or puncture, and this part of the tire will be pressed snugly against the interior of the pad.

The arms or horns $c'\ c'$ yield separately to the pressure of the tire in use, and the hole-closer sets on and retains its place on the tire and keeps the pad snugly in contact with the part of the tire having the hole. The inward curving of the spring-horns toward each other at their free ends enables them to be less disturbed by the expansion of the tire when the weight of the rider is on the wheel, and the space between the spring-horns inside their free ends affords an opportunity for the entrance of the inflated tire, thus preventing any injurious tipping of the device on the tire.

The hole-closer shown in Fig. 4 is also to close a hole in the outer or tread surface, but it shows a single arm $e$ with a foot or clamp $e'$.

In Fig. 5 the device marked $f$ is shaped to close a hole at the side of the tire near the rim, it having a pad $f'$ and a foot $f^2$ at the end of a spring-arm.

In the use of my hole-closing device the tire, having been punctured, is deflated, and my device is then applied to the tire with the pad over the puncture, the arms or spring end of the device embracing only a part of the tire, the said arms not extending to the felly, and then as the tire is again inflated the arms will be expanded with the pressure of the inflated tire within them, which will cause the arms to cling to the tire firmly. As the tire is run and its shape changed, due to the weight of the rider on the wheel, the device does not touch the felly.

If the ends of the device should strike the felly, the device would not only be stopped, thus permitting the tire to be removed from contact with the pad, but the device might, by contact with the felly, be dislodged or tipped off the tire, and, further, the contact of the device with the felly would injuriously mar and wear the latter.

After the device has been applied to the tire and the latter inflated or put in use, the two spring-horns, as the wheel runs carrying a load, are operated or expanded by the expanding tire one just before the other, so that by having two points of contact at the end of the device a better hold is insured on the tire.

My hole-closer may be variously modified as to its shape to adapt it to the particular location of the hole in the tire, but most of the punctures will be in the outer or tread face of the tire, and the form shown in Figs. 1, 2, and 3 will apply.

My device is the first, I believe, to fit but partially about the tire without regard to the felly, and in operation to cling to the outer portion of the tire, it keeping its position thereon by its own inherent elastic properties, when the tire inside the device is inflated, and the greater the inflation the more closely the device sets itself upon the hole or puncture, and consequently the hole or puncture is closed substantially air-tight, and by not contacting at all with the felly, the tire, as it is flattened or expanded, cannot get away from the hold or pressure of the device on the punctured part.

Preferably the pad will be permanently attached to the inner side of the hole-closing device or clip.

Having described my invention, what I claim as new, and desire to secure by Letters Patent, is—

1. A hole-closing device for bicycle-tires, the same consisting of a metallic spring-clip having an interior opening less than the diameter of the tire, and adapted to be applied to and but partially surround a deflated tire, the subsequent inflation of the tire expanding and seating the clip firmly on the punctured part of the tire, substantially as described.

2. A hole-closing device for bicycle-tires, the same consisting of a metallic spring-clip having an interior opening less than the diameter of the tire, and adapted to be applied to and but partially embrace a deflated tire, the subsequent inflation of the tire seating the clip firmly on the punctured part of the tire, and a pad interposed between the said clip and tire, substantially as described.

3. A hole-closing device for bicycle-tires, the same consisting of a metallic spring-clip having an interior opening smaller than the diameter of the tire, and provided with curved spring-arms, said clip being adapted to be applied to and embrace but a portion of a deflated tire, the subsequent inflation of the tire seating the clip firmly on the punctured part of the tire, substantially as described.

4. A hole-closing device for bicycle-tires, the same consisting of a metallic spring-clip having two curved spring-horns at each end, and adapted to be applied to a deflated tire, the subsequent inflation of the tire seating the clip firmly on the punctured part of the tire, substantially as described.

5. A hole-closing device for bicycle-tires, the same consisting of a metallic spring-clip having an internal opening normally smaller than the tire and adapted to embrace and extend nearly about said tire from its outer or tread face toward the rim, the said clip having a plurality of spring-horns to engage and to cling to the tire near the rim, said spring-horns being adapted to yield separately, substantially as described.

6. In a hole-closing device for bicycle-tires, a metallic spring-clip having a plurality of separate spring-horns, and having an interior space smaller than the diameter of the tire, the said spring-horns being curved to bring their outer ends toward each other and leave a space between said horns which may be entered by the inflated tire, substantially as described.

In testimony whereof I have signed my name to this specification in the presence of two subscribing witnesses.

JAMES L. HATCH.

Witnesses:
LAURA T. MANIX,
FREDERICK L. EMERY.